United States Patent [19]
Chance et al.

[11] 3,773,359
[45] Nov. 20, 1973

[54] INTERMEDIATE DRILL STEM
[75] Inventors: Glenn G. Chance, Houston; Sam T. Crews; Clenis E. Wilson, both of Midland, all of Tex.
[73] Assignee: Smith International Inc., Whittier, Calif.
[22] Filed: June 24, 1971
[21] Appl. No.: 165,810

Related U.S. Application Data
[63] Continuation of Ser. No. 825,109, May 1, 1969, abandoned, which is a continuation-in-part of Ser. No. 669,138, Sept. 20, 1967, abandoned.

[52] U.S. Cl............... 285/286, 308/4, 285/333
[51] Int. Cl............................................. F16l 13/02
[58] Field of Search................. 285/21, 22, 333, 285/334, 286, 45; 64/1; 308/4, 4 A; 175/325

[56] References Cited
UNITED STATES PATENTS

| | | | |
|---|---|---|---|
| 3,152,458 | 10/1964 | Simonia | 64/1 |
| 2,073,093 | 3/1937 | Brantly | 285/286 X |
| 2,259,232 | 10/1941 | Stone | 285/334 X |
| 2,301,495 | 11/1942 | Abegg | 285/333 X |
| 2,664,272 | 12/1953 | Boice | 287/125 X |
| 3,080,179 | 3/1963 | Huntsinger | 285/333 X |
| 3,193,918 | 7/1965 | Heldenbrand | 308/4 |
| 3,458,922 | 8/1964 | Schellestede et al. | 285/286 X |

FOREIGN PATENTS OR APPLICATIONS
865,883   2/1953   Germany ............................ 285/333

Primary Examiner—Dave W. Arola
Attorney—Murray Robinson

[57] ABSTRACT

Intermediate drill stem includes an alloy steel body of smaller inner diameter than usual for drill pipe and machined to drill pipe outer diameter except having one or more integral protectors of larger outer diameter at intervals along its length and except further having integral transition portions of somewhat larger than drill pipe outer diameter near its ends and portions of elevator shoulders at the ends, the ends also being built up externally and internally with weld metal to match the wall thickness of extra long alloy steel connector members rod welded to the ends of the body. Typically the body of the intermediate drill stem is made from a worn out drill collar. If the ends of the old collar are not too far gone the original integral drill collar connectors can be used instead of welding on connector members. New material may be used for the body and if anticipated loading is not too great carbon steel could be used instead of alloy steel. In any case, the integral protectors could be omitted. However, if a radially integral protector is used, intermediate stem can be made from a plurality of lengths of material welded together at the thick wall area of the protector.

9 Claims, 10 Drawing Figures

United States Patent [19]
Chance et al.

[11] 3,773,359
[45] Nov. 20, 1973

Glenn G. Chance
Sam T. Crews
Clenis E. Wilson
INVENTORS

INTERMEDIATE DRILL STEM

CROSS-REFERENCES TO RELATED APPLICATIONS

This application is a streamlined continuation of application, Ser. No. 825,109, filed May 1, 1969, now abandoned which is a continuation-in-part of our prior application filed Sept. 20, 1967, Ser. No. 669,138 now abandoned.

BACKGROUND OF THE INVENTION

A. Field of the Invention

The invention pertains to intermediate drill stem placed between the drill collars and drill pipe of a drill string used in the rotary system of drilling holes in the earth, e.g., oil wells. Intermediate drill stem provides a gradual transition between the rigid drill collar part of the drill string and the flexible drill pipe part of the drill string. Intermediate stem resembles drill pipe in that the outer diameter is the same as that of drill pipe so as to fit drill pipe elevators, and the polar moment of inertia of the cross-sectional area of the connectors is larger than that of the body, so that the connections are more rigid than the body and most of the flexing takes place in the body and the connections need not be made up as tight as for drill collars to prevent the shoulder seal from opening up under load. On the other hand intermediate stem resembles drill collars in that it is run in compression to put weight on the drill bit and the inner diameter is close to that of drill collars, providing a thick wall for weight, wear and strength. Body rigidity of intermediate stem is intermediate that of drill pipe and drill collars

B. Description of the Prior Art

Prior workers in the art have tried out intermediate stem made by flash welding the necked down ends of conventional drill pipe tool joints to a body made of heavy wall pipe. In this construction the body was not machined from drill collar stock and did not include any protector to prevent wear of the body caused by flexure into contact with the side of the earth bore. The tool joint connectors were of conventional length and not adapted for remachining when worn, it being contemplated that the body would wear out before the tool joints. Only a small number of lengths of such intermediate stem could be used due to the excessive wear on the lowermost lengths where the compression loading and flexure are greatest.

SUMMARY OF THE INVENTION

The principal object of the invention is to provide an intermediate drill stem that has a longer life than previously known intermediate drill stem. This is accomplished by the provision of an alloy steel body with one or more protectors integrally formed along its length and with the connectors at each end, especially the pin end, having great length.

The protectors intermediate the connectors and the connectors, both, keep the body of the intermediate stem out of contact with the well wall immediately adjacent to the connectors and the protectors, thereby reducing wear on the body. The protectors and connectors both act as centralizers so that by use of protectors the laterally unsupported body length between centralizers is reduced. The reduction may be to the point where the product of the unsupported body length and the bending deflection per unit length under expected load will be less than the difference between hole radius and body radius, thereby keeping the body out of contact with the well wall throughout its full length. Under ordinary conditions one protector per usual thirty foot length of intermediate stem accomplishes this result.

The use of extra long connectors aids in accomplishin the foregoing result since they reduce the degree to which the connectors can cant in the hole. A connection made up of pin and box connectors having a combined length (of maximum diameter portion) less than the hole diameter can cant in the hole to an extent limited only by the pipe connected thereto. Connector diameter is usually not in excess of about 80 percent of hole diameter so that to prevent such unlimited canting, the overall connection length must be at least about 125 percent of the connector outer diameter. However, to effectively limit canting and keep the connection axis nearly parallel to or in alignment with the hole axis, the overall length of the maximum diameter portion should be much greater. According to the preferred embodiment of the invention the overall pin and box connection length is from about 400 to 1,000 percent of the outer diameter of the connectors. For very large and very small diameter holes, connector diameter may be considerable less than 80 percent of hole diameter and an overall pin and box connection length of 1,500 percent or more of the outer diameter of the connectors may be used. Perhaps a more precise indicator of the magnitude of the connector length according to the invention compared to that of drill pipe is the absolute length of the connectors. According to the preferred embodiment of the invention the combined length of the maximum outer diameter portions of the connectors will lie in the range of about 2.3 to 6.0 feet, with a rounded mean of about 4 feet, compared to about 1.5 for usual drill pipe tool joint connections which range from about 1.2 to 1.8 feet combined length of maximum outer diameter portion.

As a result of the use of protectors and long connectors, the body may be kept substantially out of contact with the well wall, thereby greatly increasing the life of the body. The use of high strength alloy steel for the body keeps the bending stresses well below the yield strength of the body so that the number of cycles of flexure permissible prior to fatigue failure approaches infinity. To balance the connector life with the long life of the body, the extra length of the connectors allows for remachining of the threads.

A further object of the invention is to provide an inexpensive intermediate drill stem of the aforementioned type. To this end a worn out drill collar may be used for the body of the intermediate stem and the connector members made of new drill collar stock, welded to the body. The elevator shoulder is formed on the body rather than the connector, so that the weld can be made between connector and body ends of maximum thickness. This permits the use of rod or bead type welding i.e., where metal not originally part of the pieces being welded together is added to the pieces in the process of welding them together and forms the joint between them, thereby eliminating the need for expensive flash welding or other equipment not requiring the incorporation into the weld of additional metal. Rod, bead, or other welding processes in which metal is added may be called "added metal welding." The inner surface of the body ends is built up with weld metal to the same diameter as the connector prior to being welded thereto.

In the process of welding the connector to the body, weld metal is built up on the outside of the end of the body so that it is at least as large as the connector. The elevator shoulder is formed at the built up end of the body of the intermediate stem. Adjacent the elevator shoulder the body is provided with a transition portion of somewhat larger outer diameter than the main part of the body so that there will be a gradual transition in rigidity between the connectors and the main part of the body to prevent stress concentration at the weld. The connectors welded to the ends of the body are long enough so that when added to the length of the worn out drill collar the resulting intermediate stem is long enough to stand in the usual racks and to reach up to the platform for workers in the top of the drill rig, with enough length to spare so that the connectors can be cut back and remachined when worn down.

In the case of range III intermediate stem, which has a length of about 45 feet or one and a half times the length of the usual approximately 30 foot Range II intermediate stem, a further economy is effected by welding together end to end two lengths of shorter material, the weld being located at a protector whereby the wall thickness is great enough to provide the needed strength of the weld. Hard facing is applied adjacent the weld to maintain the outer diameter of the protector. Even though the protector includes an axial weld at its mid portion, the protector portions at each side of the weld are radially homogenous with the body of the intermediate stem therebelow, as distinct from welded on sleeves.

It is important to note that the body of the intermediate stem is machined, whereby the protectors are formed homogeneously integral with the body without welding or upsetting, for any welding or upsetting, especially in an alloy steel body, can cause physical changes that alter the material whereby the intermediate stem might fail in use.

Other features of the invention pointed out in the claims can best be set forth in the course of the following detailed description of a preferred embodiment of the invention, reference being had to the accompanying drawings, it being understood however that such embodiment is only exemplary and can be varied by one skilled in the art without departing from the spirit of the invention.

DESCRIPTION OF PREFERRED EMBODIMENTS

Figures 1, 2A:
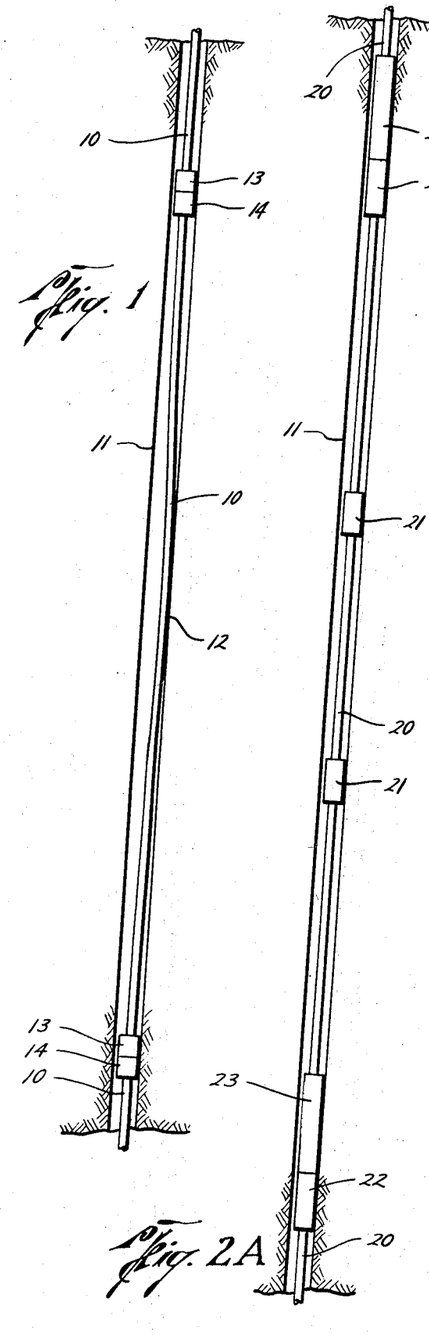
FIGS. 1 and 2, and 2A are schematic fragmentary sectional views each showing intermediate stem in use in a well bore, FIG. 1 showing the prior art type of intermediate stem, FIGS. 2 and 2A showing intermediate stem embodying the present invention.

Referring now to FIG. 1 there is shown a portion of a drill string, including several lengths 10 of intermediate drill stem. Due to the compressive loading of the intermediate stem and the long unsupported length of the body it has deflected into contact with the low side of the well bore 11 at point 12. The tool joints 13, 14, are also in contact with the well bore. The contact of the wall and stem body at point 12 causes excessive wear on the body which results in its early failure. It is not necessary for the body to wear completely through to fail, for due to the compressive loading the wall of the pipe may buckle. The contact of the tool joints 13, 14 with the well wall will cause wear on the boxes 14 which ultimately will result in failure of the tool joints.

Figure 2:
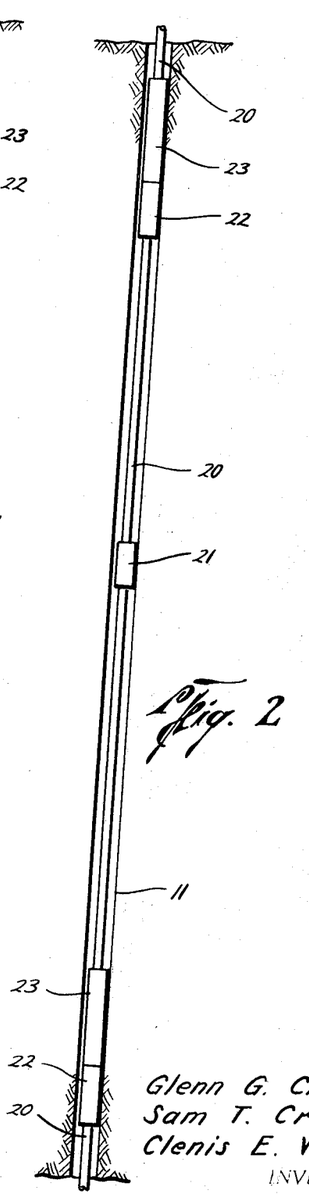

Referring now to FIG. 2, there is shown a portion of a drill string including several lengths 20 of intermediate drill stem embodying the invention. Due to compressive loading of the intermediate stem it has flexed placing the protectors 21 in contact with the side of the well bore 11. The connectors 22, 23 are also in contact with the well bore. The protectors 21 prevent wear on the smaller diameter portions of the intermediate stem. The high strength of the alloy steel body of the stem provides a low stress ratio to resist fatigue. The long connectors 22, 23 reduce canting, resist wear, and provide length for remachining of the threads as may be required due to the extra life of the stem.

Figure 3:
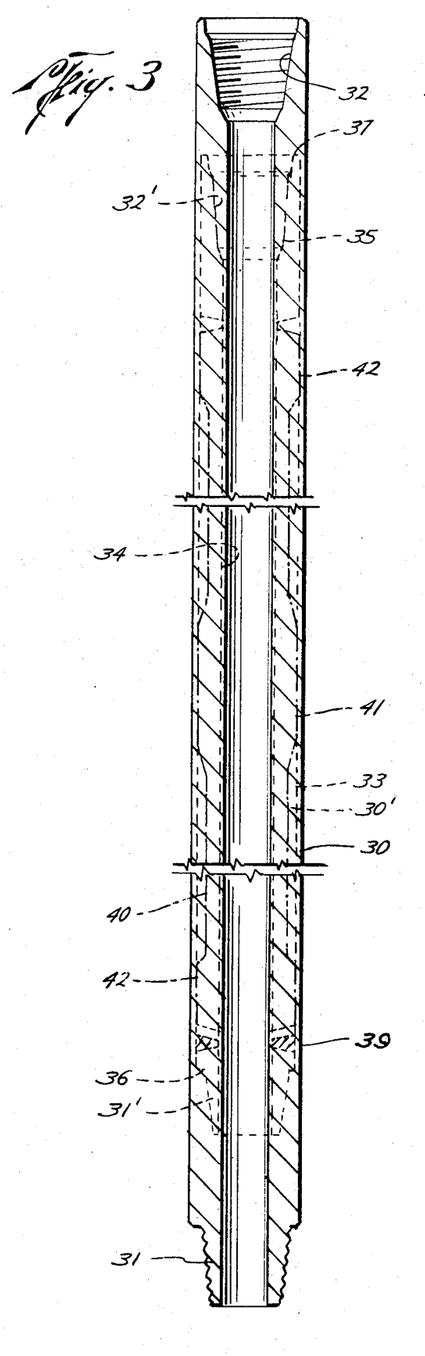
FIG. 3 is an axial section through a new drill collar showing in short-dashed lines the outline of a worn-out, stubbed drill collar and in heavy-dashed lines the outline of the body blank of an intermediate stem in accordance with the invention.

Referring now to FIG. 3, there is shown a new alloy steel drill collar 30 having a uniform outer diameter from end to end except for a threaded connector pin 31 formed at one end. The inner diameter of the drill collar is uniform from end to end except for a threaded connector box 32 formed at the end opposite from the end at which the pin 31 is formed.

The dotted line outline in FIG. 3 shows the dimensions of the same drill collar after it is worn out. The outer periphery 33 has worn down considerably and the inner periphery 34 is worn to a slightly larger diameter than on the new collar. The box end of the drill collar has several times been cut back and rethreaded at 32' so that the length of the drill collar has been reduced. The pin end of the drill collar has several times been out back and remachined and finally a connector stub 31' has been welded on at 39 and it too has several times been cut back and remachined so that the length of the drill collar has reduced at the pin end too. Although the pin end of the collar could be restubbed, the box at the other end has such a thin wall that the connection would no longer be strong enough, being likely to fail at the bottom 35 of the box. Also, the pin shoulder 36 and box end face 37 are so small that the metal is apt to yield in compression if the pin and box are stressed enough in make up to prevent the pin shoulder to box end face contact area from opening up when the connection is subjected to bending moment. The connection is thus likely to leak and fail through a washout. If the box end of the drill collar were stubbed, the large outer diameter of the stub would soon wear down to the same diameter as the rest of the drill collar; also, stubbing both ends would cost about the same as machining a new drill collar. In short, the drill collar 30' is worn out. Because it is made of alloy steel it is not even useful as structural steel since it must be preheated if it is to be welded successfully.

The heavy dash outline in FIG. 3 shows the outline of the body blank of a length of intermediate stem. The outer periphery 40 has been machined down to drill pipe outer diameter, except at 41 which is left at the diameter 33 of the worn drill collar, thus forming an integral protector for the intermediate stem, and except further at the ends 42. To complete the intermediate stem the connectors 31', 32' are cut off and new alloy steel connectors the same size as connectors 31, 32 are welded to the ends 42.

Figure 4:
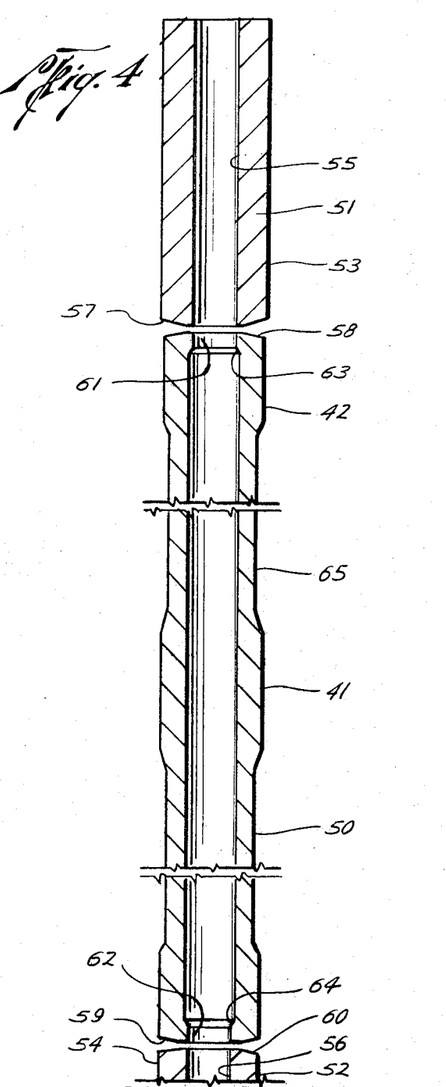
FIG. 4 is an axial section through the component machined body and blank connector portions of the intermediate stem of FIG. 2 prior to welding together and machining of the connectors.

Referring to FIG. 4 there are shown the body blank 50 of the intermediate stem machined from the worn drill collar 30, and connector blanks 51, 52 to be welded thereto. The outer peripheries 53, 54 of the connector blanks are of full new drill collar diameter. The inner surfaces 55, 56 of the connector blanks are of the same inner diameter as a new drill collar. The ends of the body blank 50 and the adjacent ends of the connector blanks are beveled slightly as shown at 57, 58, 59, 60 to facilitate welding. The ends of the main body blank 50 are built up interiorly with weld metal at 61, 62 to the same inner diameter as the connector blanks and machined smooth. The juncture of the weld metal 61, 62 with the main body is tapered at 63, 64 (see also FIG. 5).

The lengths of the blanks 51, 52 are chosen so that altogether with the body 50 taken from a worn drill collar the total length of the intermediate stem will be of the desired amount, e.g., 30 to 31 feet, the same as the length of a new drill collar or drill pipe or intermediate drill stem. The minimum length of the box connector blank is preferably 15 inches for a 6½ inch O.D. connector; the minimum length of the pin connector blank for the same O.D. is preferably 18 inches, the extra three inches allowing for cutting a pin while still leaving about a foot of full diameter connector material. For example, assuming a length of 4½ inch for the threaded portion of the pin, as is conventional for 6½ inch O.D. connectors, the eighteen inch blank length provides for 13½ inches of maximum outer diameter portion. For 6½ inch O.D. connectors, the minimum ratio of length to diameter of the maximum outer diameter portion of the connector is therefore 12/6.5 or 1.85 for the pin and 15/6.5 or 2.3 for the box. The minimum length of the maximum outer diameter of the combined pin and box connectors is thus about four (1.85 plus 2.3 equals 4.15) times the outer diameter of the connectors, as compared to the ratio of about three to one for a conventional tool joint connection. The maximum angle of cant is thus only 75 percent of that of an ordinary tool joint in an uncased hole.

Figure 5:
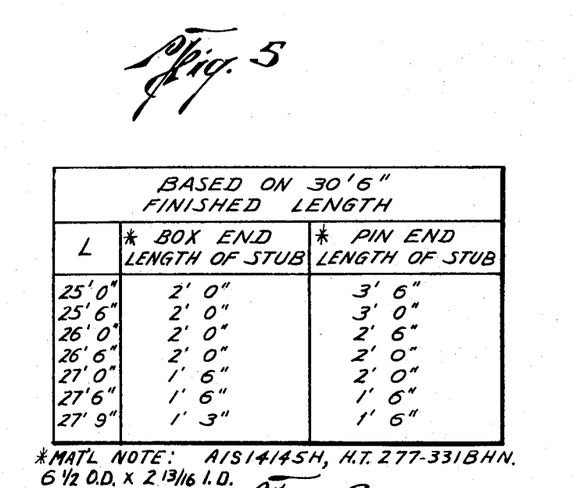
FIG. 5 is a schedule of typical dimensions and material specifications.

For shorter lengths of body 50, the lengths of the connectors will be increased, preferably as shown in the FIG. 5 chart, the lengths being chosen so that there will be a relatively small number of different sizes of connector blanks to handle the full range of body lengths. The maximum box connector should not exceed about 2 feet in length (an L/D ratio of 3.69 for a 6½ inch connector O.D.) because otherwise the pipe tongs applied to the pin would be too high to be handled from the rig floor when lengths of the intermediate stem are added or removed from the drill string. Furthermore, if the box were over about 2' in length, the the elevator, which is attached below the box shoulder, could not be raised in the standard derrick to a convenient height relative to the monkey board. Therefore for the more common 25 foot body lengths resulting from fully worn out drill collars, the pin connector is three and one-half feet long compared to only 2 feet for the box connector blank. A characteristic feature of the preferred embodiment of the invention is thus a connector pin of great length, for example the length of the maximum outer diameter portion of the pin ranging approximately from 2 to 7 times the diameter of the connector. The lower limit of approximately 2 is derived from one foot minimum length of maximum outer diameter portion of the pin and a 6½ inch O.D. connector as previously discussed (12/6½ inch = 1.85). The upper limit of approximately 7 corresponds to a pin having a length of maximum outer diameter portion of (6½) (7) or 45½ inches. Adding 4½ inch for the threaded portion of the pin gives an overall pin length of 50 inches or 4.2 feet. This is considerably longer than the greatest pin length of 3½ ft. specified in FIG. 5, such a pin length corresponding to an L/D ratio of only (42-4.5 inches)/6.5 which equals 5.8.

From the pin max. O.D. length/diameter range of 1.85 to 7 and the box length/diameter range of 2.3 to 3.69, the range for the ratio of length to diameter of the maximum outer diameter portion of the combined pin and box is therefor from 1.85 plus 2.3 = 4.15, or about 4, to 3.54 plus 7 = 10.54, or about 10.

Actually, the upper limit on the length of the pin connector is related to the requirement that there be enough small diameter portion of the intermediate stem to insure that flexure thereof will not strain the material beyond the yield point. For these reasons perhaps a more precise indicator of the magnitude of the connector length according to the invention compared to that of drill pipe is the absolute length of the connectors. The length of the maximum outer diameter portion of the pin (pin length less 4½ inch threaded portion) as indicated by the FIG. 5 chart, may vary from about 1.1 to 3.1 feet for a mean of about 2.1 feet corresponding to a total pin length of 30 inch. With a box of the preferred maximum length (24 inch), the combined length of the maximum outer diameter portions of the connection is thus aoubt four feet (2 + 2.1 feet).

Although body blank 50 has been described as made from an old drill collar, it could of course be machined from new stock having an outer diameter equal to that of the protectors 41. If the protectors are omitted or made of smaller outer diameter and if a welding technique adapted to make a satisfactory weld with thinner material at the ends of the body where it joins the connectors is adopted, the new stock could have a smaller outer diameter. However, the outer surface 65 of the body of the intermediate stem will always be a machined surface, i.e., turned in a lathe or milling machine, unless the integral protectors 41 are entirely omitted and the ends 42 omitted or formed by forging upsets on the ends of a bar or tube, in which latter case the surface 65 could be a mill surface, i.e., extruded or rolled. A machined outer surface 65 is therefore a distinguishing characteristic of the preferred embodiment of the invention.

FIG. 5 specifies an AISI 4145H alloy steel for the connector blanks. This is the same type steel as for the body blank 50 in the usual case where the body is made from a worn out drill collar. Alloy steel may be defined with reference to the AISI (Americal Iron and Steel Institute) standards as comprising the AISI 1,300 to 9,900 range steels as distinct from the carbon steels in the AISI 1,000 to 1,200 range. See Mark's Mechanical Engineers Handbook, Sixth Edition, pages 6–32 through 35 for a list of the compositions of the AISI standard steels. Although the body 50 of the intermediate stem could be made of carbon steel, e.g., in the case of new material, alloy steel is preferred because of its greater strength since the intermediate stem is run in compression. An alloy steel body is therefore a characteristic of the preferred embodiment of the invention. Preferably the yield strength is at least 120,000 psi.

Figure 6:
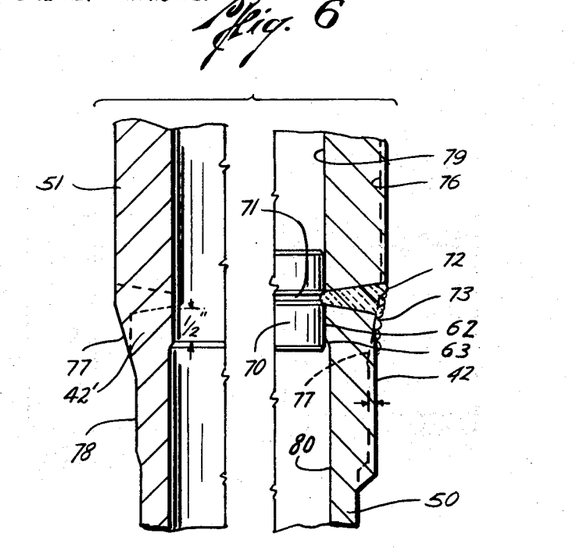
FIG. 6 is a composite enlarged fragmentary sectional view of the junction of the body and a connector blank showing in the right-hand part of the figure the body and blank after welding together and with the weld support ring still in place prior to machining, the finished outer diameter being indicated in dotted lines, the left-hand part of the figure showing the finished juncture.

Referring now to FIG. 6, there is shown the method of welding the connector blanks to the body blank 50. The procedure is the same for both the pin and box connector blanks so the procedure at only one end will be described. The pin connector blank 51 is aligned concentrically with body blank 50 by means of a generally exteriorly cylindrical support 70, which may be tubular or solid. The exterior of the support has an annular groove 71 which is positioned under the gap between the end of body blank 50 and the end of connector blank 51. The assembly is preheated, e.g., in a furnace, and then the gap is filled with weld metal from a welding rod heated electrically or with a torch. An automatic welding machine of the submerged arc type employing rod (wire) wound on reels and fed to the weld automatically with weld flux simultaneously fed around the wire from a hopper to the weld area is suitable equipment for this purpose.

As shown at 72 the weld metal is built up beyond the outer periphery of the connector and also overlapping the outer periphery of the end 42 as shown at 73. The end assembly comprising connector and transition portion is then heated to relieve stresses resulting from welding. The outer periphery of the connector, weld, and end are then machined down to the dotted line level 76, removing about one-sixteenth to one-eighth inch depth of metal from the exterior of the connector, forming an 18 degree taper elevator shoulder 77, and removing about one-eighth to three-sixteenths inch depth of metal from the outer surface of end 42 forming transition portion 78. By this process the adversely heat affected metal at the surface of the connector and transition portion and weld are removed. The support 70 is then bored out to the same inner diameter as the inner periphery 79, of the connector, the bore extending past the built up weld metal 62 inside the transition portion and the bevel 63 at its juncture with the inner periphery 80 of the main body 50. Finally, the connector threads are machined.

The outer diameter of the transition portions 78 is intermediate between the outer diameters of the main portion of the body 50' or body blank 50 and residual portions of the original ends 42 of the body blank. The outer diameter of portions 42' may be of the same size as that of protectors 41.

Hard facing may be applied to the pin and box connectors and the protectors, or any of them, if desired.

Figure 7:
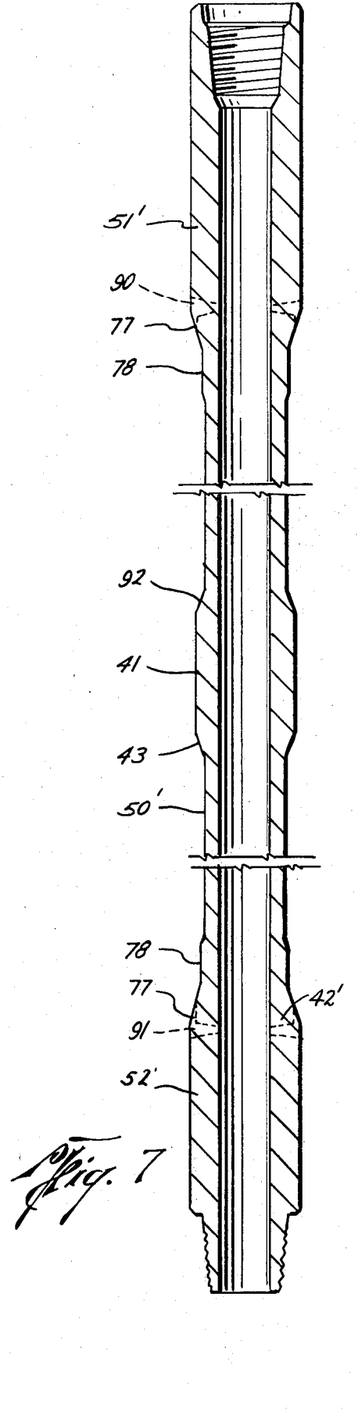
FIG. 7 is an axial section through a finished intermediate drill stem embodying the invention.

Referring now to FIG. 7 there is shown the finished intermediate drill stem including main body 50' of alloy steel having one or more integral protectors 41 spaced apart along its length, transition portions 78 at the ends of the body and finished box and pin connectors 51', 52' of alloy steel rod welded thereto by welds 90, 91, with elevator shoulders 77 adjacent to and including the welds.

As noted in the preceding paragraph, more than one protector may be employed on a single length of intermediate stem. FIG. 2A illustrates such a construction using two protectors 21. Otherwise, the construction shown in FIG. 2A is the same as that of FIG. 2, previously described.

It is to be noted that although the body of the intermediate stem is of smaller outer diameter than the worn drill collar from which it is made, it still has a thick wall compared to drill pipe. For example, the wall thickness may be three-fourths to twenty-seven thirty-seconds inch for 4½ inch O.D. intermediate stem and seven-eighths to thirty-five thirty-seconds inch for 5 inches O.D. intermediate stem. The larger values of wall thickness represent intermediate stem made from only slightly worn drill collars and the lower values correspond to intermediate stem made from well worn drill collars. Intermediate stem made from new material preferably lies within this range near the thicker end thereof. The upper end of the preferred range, over 1 inch thick corresponds to large diameter intermediate stem made of used material and to most intermediate stem (except small diameter sizes) made of new material. Obviously the thicker the wall of the intermediate stem the less the unit stress imposed thereon so that with thick wall intermediate stem non-alloy steel, e. g. of the A.I.S.I. 1,100 to 1,200 series could be used more satisfactorily than with thinner wall intermediate stem. These wall thicknesses are considerably greater than that of drill pipe which ranges from about one-fourth to one-half inch. See pages 682 and 717 of the 6th edition of the Rotary Drilling Handbook, edited by J. E. Brantley, published in 1961 by Palmer Publications. The following table incorporates information there set forth:

| O.D. | | I.D. | | Wall thickness | |
|---|---|---|---|---|---|
| Drill pipe | Drill collars | Drill pipe | Drill collars | Drill pipe | Drill collars |
| 2⅜ | | 1.815 | | .280 | |
| 2⅞ | | 2.151 | | .362 | |
| 3½ | | 2.602 | | .449 | |
| 3½ | | 2.704 | | .368 | |
| | 3½ | | 1¼ | | 1.0 |
| 4 | | 3.340 | | .330 | |
| | 4⅛ | | 2 | | 1¹/₁₆ |
| 4½ | | 3.640 | | .430 | |
| 4½ | | 3.826 | | .337 | |
| | 4¾ | | 2¼ | | 1¼ |
| 5 | | 4.276 | | .362 | |
| 5½ | | 4.670 | | .415 | |
| 5½ | | 4.778 | | .361 | |
| | 5¾ | | 2¼ (or 2¹³/₁₆). | | 1¾ |
| | 6 | | 2¼ (or 2¹³/₁₆). | | 1⅞ |
| | 6¼ | | 2¼ (or 2¹³/₁₆). | | 2 |
| | 6½ | | (2¹³/₁₆) or 2¼. | | 2⅛ |
| 6⅝ | | 5.965 | | .330 | |
| | 6¾ | | (2¹³/₁₆) or 2¼. | | 2¼ |
| | 7 | | 2¹³/₁₆ | | 2⅛ |
| | 7¼ | | 2¹³/₁₆ | | 2¼ |
| | 7¾ | | (2¹³/₁₆) or 3 | | 2⅜ |
| | 8 | | (2¹³/₁₆) or 3 | | 2½ |

From the foregoing table it is seen that outer diameter characteristic of drill pipe ranges from 2⅜ to 6⅝ inch whereas inner diameter characteristic of drill collars ranges from 1½ to 3 inch. As noted previously, intermediate stem has an outer diameter characteristic of drill pipe, but an inner diameter characteristic of drill collars, albeit worn drill collars.

The foregoing table also shows the wall thickness of various sizes of API (American Petroleum Institute) standard drill pipe and drill collars. A wall thickness of about five-eighths inch may be considered as the demarcation line between thick drill pipe and thin intermediate stem.

However, the body wall thickness is much less than that of the connectors which have the same wall thickness as standard drill collars. Therefore even though the combined rigidity of the connectors is only a fraction, e.g. 60 percent of that of the unthreaded portions thereof, even when fully made up with the unthreaded pin root and box mouth (about 1 inch long) in tension and compression, the rigidity of the connector is still in excess of the rigidity of the main body of the intermediate stem.

That the foregoing is true will be apparent from consideration of a specific example. Assume a balanced connection, as is preferable, wherein any flexure which takes place is evenly divided between the pin and box. To this end, for usual tapers (1.5 to 3 inch per foot) and usual lengths of threaded portions (2 to 4.5 inch), the polar section modulus (I/C where I is the polar moment of inertia and C is the distance to the fibre carrying the greatest stress) of the box at the root of the thread three-eighths inch toward the box mouth from the end of the pin when made up therein (hereinafter called the box bottom) should be 2¼ to 3¼, preferably 2½ times the polar section modulus of the pin at the root of the thread three-fourths inch from the pin shoulder (hereinafter called the pin base). When such connections are properly made up, e.g. according to the make up torque specifications given in the Hughes Tool Company Section of the 1966–67 Composite Catalogue of Oil Field Equipment and Services at page 2558 for tool joints and on page 48 of the 1963 edition of Rotary Shouldered Connections, published by Drilco Oil Tools, Inc., relative to drill collars, the intermediate stem being made up the same as for tool joints, the box mouth and pin shoulder will not separate under normal loading. The box bottom is therefore the most flexible part of the connection.

The following table gives the polar moment of inertia of the body and of the connector box bottom for balanced connections of various sizes of drill pipe, intermediate stem, and drill collars:

that the rigidity of the body be considerably less than that of the connectors, i.e. less than that of the connector box bottom with balanced connectors, so that flexure will take place primarily in the body rather than in the connectors thereby prolonging the life of the connectors. This is a basic distinction from drill collars wherein the opposite holds true.

Preferably, the connector rigidity is at least twice that of the body of the intermediate stem. This means that it is desired that the polar moment of inertia of the box bottom of each connector box be at least twice the polar moment of inertia of the body of the intermediate drill stem. Since the polar moment of inertia is roughly directly proportional to the fourth power of the outer diameter, the connectors should have an outer diameter of $(2)^{¼}$ or 1.2 times the diameter of the main body of the stem. For example, with a 5 inch outer diameter for the main body of the stem, the connectors should have an outer diameter of at least 6 inch.

Since flexure takes place primarily in the body of the intermediate stem of the invention the thick walled alloy steel body with integral protectors is most advantageous to prevent wear due to rubbing on the side of the well wall. In this regard it should be noted that to provide long wear, prevent cutting into the well wall, and to reduce canting, the protectors should have a length of at least about twice the outer diameter of the protectors and should have tapered ends as shown at 92, 93 in FIG. 7.

The protectors of the present invention are to be distinguished from so-called drill pipe protectors used to prevent wear when drill pipe is run inside casing. The latter are usually made of rubber. The protectors of the present invention are made of metal and preferably have a hardness of at least 250 Brinell, e.g., 277–331 Brinell. They are machined integral with the body of the intermediate stem which distinguishes them from various subsequently applied types of metal drill pipe protectors. The hardness of the body of the stem is preferably that of conventional drill collars, e.g., above 250 Brinell, preferably 277–331 Brinell.

In order to be effective in keeping the main portion of the body of the intermediate stem out of contact with well wall, the outer diameter of the protectors should be as large as possible compatible with other drilling requirements such as fluid flow between protector and well wall. An outer diameter equal to that of the maximum outer diameter portion of the connectors would be preferable. However, since the protector is to be integral with the body and the body formed by machining down a tube of metal whose outer diameter from end to end is initially the same as that of the pro-

[I=Polar moment of inertia=0.049 $(D^4-d^4)$]

| | Drill pipe | | Intermediate stem | | Drill collars | |
|---|---|---|---|---|---|---|
| Body O.D. (in.) | 4½ | 5 | 4½ | 5 | 6 | 6⅝ |
| Connector O.D. (in.) | 6 | 6⅝ | 6 | 6⅝ | 6 | 6⅝ |
| Body I.D. (in.) | 3.825 | 4.275 | 2¹³⁄₁₆ to 3 | 2¹³⁄₁₆ to 3 | 2¾ | 2¾ |
| Body $I_B$ | 9.75 | 14.35 | 12.1   16.1 | 25.9   27.6 | 60.7 | 76.7 |
| Connector style | 4½" XH | 5" XH | 4" IF (=4½" XH) | 4½" IF (=5" XH) | 4½" FH | 4" IF |
| Connector $I_C$ at box bottom | 54.4 | 58 | 54.4 | 58 | 51.5 | 64.5 |
| Ratio $I_C/I_B$ | 5.6 | 4.05 | 3.38 | 2.24   2.10 | 0.85 | 0.84 |

It will be seen from the foregoing table that the rigidity of the box bottom of the intermediate stem is considerably in excess of that of the body. It is a characteristic feature of the intermediate drill stem in accordance with the preferred embodiment of the invention tector, economy in material costs and machining time suggests that the protectors have a somewhat smaller outer diameter than the connectors if the body is made of new material. If the body is made of a worn out drill collar, the protector outer diameter may be that of the worn out collar. Since a collar usually becomes worn out by the connector box outer diameter wearing down so far that the box wall becomes too thin, a fairly definite minimum outer diameter for the protector is established in this case. This turns out to be one-half inch larger than the diameter of the main portion of the body of the stem, which provides a one-fourth inch standoff distance between the main portion of the body of the stem and well wall. The diameter of the protector preferably is initially at least one-half inch larger than that of the main portion of the body of the stem and may range up to as large as the diameter of the maximum outer diameter portion of the connectors. Whatever the initial diameter, as the intermediate stem is used the outer diameters of the protectors will become smaller.

The preferred minimum spacing between centralizers (connectors and/or protectors) is about 15 feet, to prevent body contact with well wall. It is to be observed that if the standoff distance of the protectors, i.e., difference between protector outer radius and that of the main portion of the body, is large, the spacing of the protectors along the length of the intermediate stem may be increased.

The connector hardness (e.g. above 250 Brinell, preferably 277 to 331 Brinell), thread form, shoulder height, and distance from shoulder to threads (e.g., 1 inch) is preferably that of conventional rotary shouldered connectors for tool joints and drill collars.

Although the intermediate stem has been described as made by welding connectors to a body formed from either a worn drill collar or from new pipe, the connectors could also be formed integral with the body, e.g., from all new stock or by using the connectors of the worn drill collar. In the latter case it is to be noted that a connector too worn to be suitable for drill collars may yet be satisfactory for intermediate stem since the make up torque need not be as high and since the flexure will take place primarily in the body of the intermediate stem rather than in the connection.

Figures 8A, 8B:
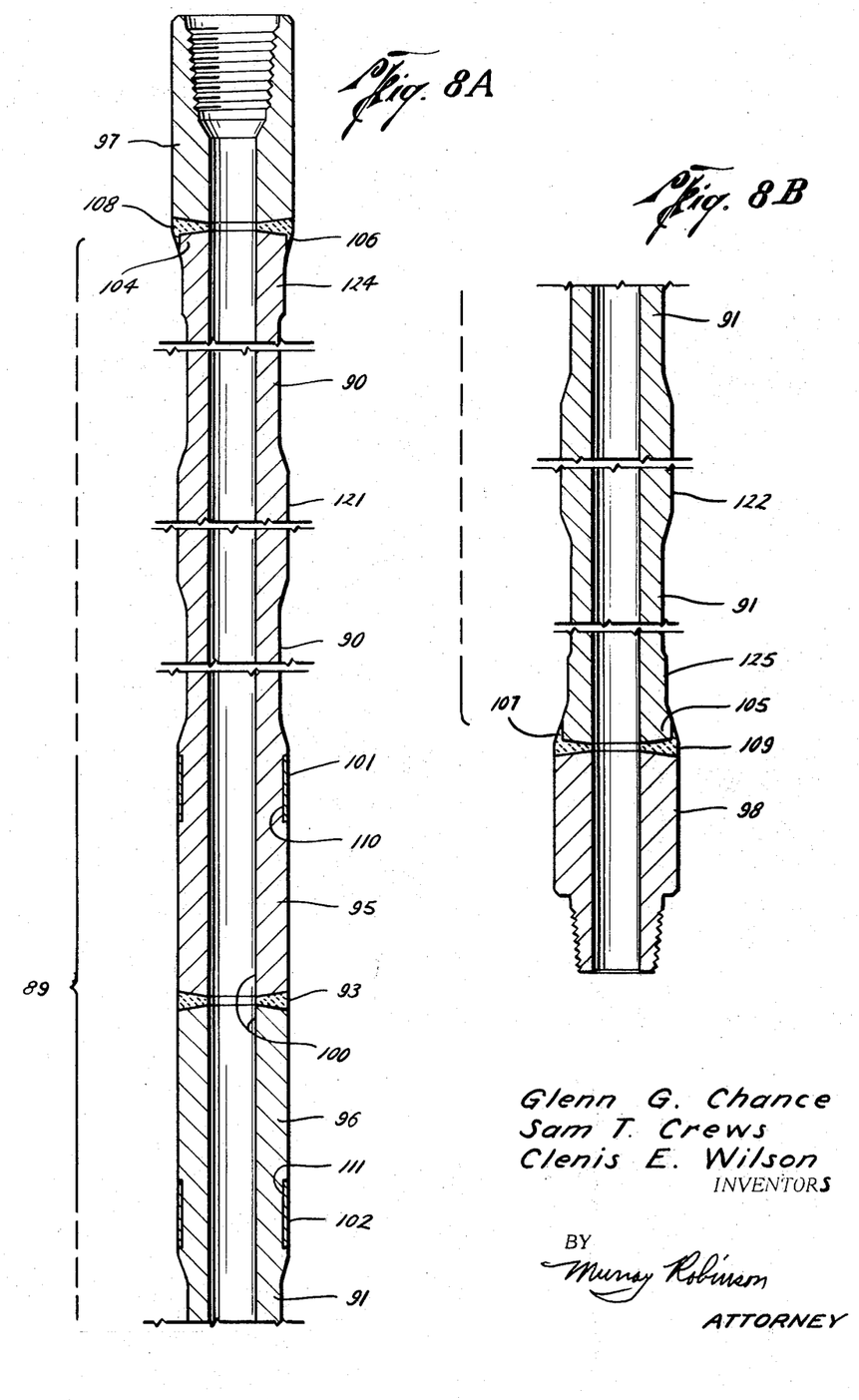
FIGS. 8A and 8B, hereinafter collectively referred to as FIG. 8, together form an axial section through a finished range III length of intermediate stem embodying the invention.

Referring now to FIG. 8, there is shown a finished intermediate stem of Range III (about 45 feet long) as compared to the Range II intermediate stem (about 30 feet long) shown in FIG. 7. Generally speaking, Range III intermediate stem could be manufactured in the same manner as the Range II stem shown in FIG. 7, from either used Range III drill collar stock as per FIGS. 3, 4, and 6, or from new stock. Because of the extra length, at least two protectors should be used to provide the minimum 15 foot spacing.

However, according to the invention, and as shown in FIG. 8, an economy is effected enabling the Range III intermediate stem to be made of shorter material, e.g., short worn out Range II drill collars, by making the main body portion 89 out of two short pieces 90, 91 welded together end to end, preferably at the mid section 93 of the intermediate stem. Adjacent the weld section 93 the pieces have large ends or butts 95, 96 which may be of protector O.D., that is, usually, as large as the worn drill collar from which the intermediate stem body is formed. A weld at such a thick wall section can be effected by "added metal welding" the same as for welding on connectors 97, 98 to the main body 89. The procedure is the same as described in connection with FIG. 5, using a ferrule to support the weld internally, the ferrule and first bead being bored out after the weld is completed.

To maintain wall thickness adjacent weld 93, the ends 95, 96 are made of great length, e.g., 2 feet, and are hard banded at 101, 102. This will insure that the area of the body 89 adjacent the weld 93 will not become worn thin during the life of the remainder of the intermediate stem. In this regard it is to be noted that although the outer ends 104, 105, of the main body portion are of the same O.D. as the midsection ends 95, 96, the outer ends 104, 105, are overlapped with weld metal 106, 107, so that the welds at 108, 109, are of full connector O.D. When the connectors wear down to protector O.D., they are worn out and replaced. The connector welds are therefore always maintained at an O.D. at least as large as the protectors so that it is not necessary to hard band the connectors for that purpose. However the connectors could of course be hard banded if desired.

The term hand banded is intended to cover the application of hard facing material such as tungsten carbide or other hard material to the outer surface of the intermediate stem, the hard facing material being retained against axial displacement by being deposited in annular grooves 110, 111, thereby forming "bands" of hard facing. The hard facing could be applied in other retaining aperture patterns than simple annular bands or could be applied without retaining apertures.

To prevent stress cracks the ends 95, 96 are preheated before the hard facing is applied. Preferably, automatic hard facing machines are used, which gives more precise control of the atmosphere and of the depth of the heat affected zone than is obtainable with manual procedures. This is important to insure adequate strength of the intermediate stem at its hard face portion.

The large ends 95, 96 and weld 93 together form a protector 120 at the midportion of the intermediate stem, the protector being distinguished by its great length. Preferably, protector 120 has a length of about 4 feet. Additional protectors 121, 122, which may be of about 2 feet in length, are provided between protector 120 and the connectors 97, 98, preferably midway therebetween. As with the FIG. 7 construction the protectors are all formed out of the same single original one piece as the body portion around which they are disposed rather than being welded, fastened, clamped or fitted thereto, whereby the metal of the protectors is radial homogeneous with that of the portion of the body 89 therebeneath.

As with the Range II construction there are provided transition portions 124, 125 of an outer diameter intermediate between that of the ends 104, 105 and the major portion of the body 89. Also, the elevator shoulders 106, 107 are tapered from the transition portions to the connectors. The taper angle of the elevator shoulder is illustrated as the standard 18° taper angle, but, as with the previously described FIG. 7 construction, other taper angles could be used. However regardless of the taper angle the elevator shoulder is formed partly on the large ends 104, 105 of body 89 and partly on the weld metal 108, 109.

As with the FIG. 7 construction, the wall thickness (min. five-eighths inch) of the major portion of body 89 is much greater than for drill pipe, so as to be able to take compressive loads and impart weight to the drill bit, the same as for the previously described Range II intermediate stem. Also, the ratio of connector O.D. to the O.D. of the main body portion (excepting the O.D.

at the protectors and near the ends of the main body portion) is at least 1.2, thereby to assure that the connection can be made up to have greater rigidity than the main body portion between the connectors.

Whether made of new or used material, if the protectors are formed of the same piece as the body therewithin, the surface of the body, at least between the protectors, will be a machined surface in the same sense as that term is used in the description of the Range II intermediate stem, namely, turned in a lathe or milling machine, as distinct from a mill surface produced by rolling or extruding. Such a surface may be called a turned machined surface and is usually recognized by the small screw thread like protuberance extending helically about the surface between the lines of maximum penetration of the machine tool cutter or bit. The possibility of subsequent grinding of the surface of course exists, but it would not normally be necessary to grind the surface.

The Range III connectors, whether new or used, will preferably be made of alloy steel, since the threads must stand the wear of repeated make up and break out. It is also preferred that the main body portion be made of alloy steel, the same as for the Range II intermediate stem previously described, although it can be made of ordinary carbon steel, the same as for Range II.

As with Range II intermediate stem made of used material, in the process of making Range III intermediate stem from used material the I.D. of the ends of the body 89 may be built up with weld metal to equal the I.D. of new connectors applied thereto, as shown in FIG. 5. This build up does not appear in FIGS. 7 and 8 which illustrate the situation when both body and connectors are made of used material worn to the same I.D. or from new material which has the same I.D.

Although in welding the connectors 97, 98, to body 89, the same added metal welding process is used as in connection with the FIG. 7 construction, other known methods of supporting the innermost bead of weld metal can be used in place of ferrule 71, the important thing being that the innermost bead be deposited inside of the connector I.D. so that this material can be removed, i.e., bored out, to produce the finished product, for this bead will have lower strength and structural quality than the remainder of the weld metal.

If range III intermediate stem is made with new body material the number of protectors could be reduced to two, similar to the construction shown in FIG. 2A, but preferably three protectors are used, equally spaced apart from each other and the connectors welded to the large ends of the body. With new material and protectors formed of the same one piece as the body portion, the central protector need not be so long, and preferably all three protectors and the two connectors at the ends should have a length of two feet at the maximum outer diameter portions thereof. Hard surfacing preferably would be applied to the protectors and connectors, e.g., in the same manner as hard surfacing 101, 102, but is not essential.

The protectors used for Range III intermediate stem are preferably tapered at their juncture with the body the same as for the Range II intermediate stem. The thread construction and all other features of the connectors used for Range III intermediate stem may be the same as those previously described for Range II intermediate stem.

As with Range II intermediate stem the connectors for Range III stem could be homogeneously integral (one piece) with the main body portion, whether the intermediate stem is made of new or used material, but especially in the case of used material where the old drill collar connectors can be left on the body and reworked.

If, as is usual, the protector O.D. is less than connector O.D., it is especially desirable to apply hard facing to the protectors to maintain their useful life throughout several reworkings of the connectors. As noted previously, this is almost a necessity in the case of a protector which includes an axial end to end added metal weld, but it is also preferable in any case where protector diameter is less than connector diameter by the amount previously indicated (protector O. D. one-half inch larger than body O. D., connector O.D. 1.2 times body O. D.). Connector O. D. may be of the order of 4¾ to 6½ inch as previously discussed, corresponding to 3½ inch and 5 inch O. D. body, but intermediate stem having other conventional drill pipe and connector diameters could be used, obviously, for example a 5½ inch body O. D. with a 7 inch connector O. D. In other words, connector O. D. is typically about 1¼ inch or 1½ inch larger than body O.D.

Although it has been previously stated that hard facing could be applied to the protectors alone, or to both protectors and connectors, it is of course possible to apply hard facing to the connectors alone, as might seem appropriate if the protectors were so long as to be able to outlast the connectors even without hard facing on the protectors. Another possible variation would be to apply hard facing to only some of the connectors, for example to only the box connectors, or to only the pin connectors. Also, in the case of Range III intermediate stem having a two piece body, the hard facing might be applied to the butt at only one side of the weld. Whereever applied, the hard facing could be applied in the manner indicated in FIG. 8.

The length of the butts for a two piece body for Range III intermediate stem preferably should be at least about 1½ feet on intermediate stem having 6½ inch O.D. connectors, or more generally speaking, about three times connector O.D. The length of the two piece protector thus formed will be about three feet. This amounts to about 6 or 7 percent of the length of Range III intermediate stem which runs from about 40 to 50 feet in length.

We claim:
1. An intermediate drill stem comprising
an elongated, tubular, steel body the main portion of which has a substantially uniform outer diameter, said body having a wall thickness of at least about five-eighths inch in the main portion thereof,
a tubular alloy steel connector connected to each end of said body,
one of said connectors being interiorly threaded at its end opposite from its end that is connected to said body, said interiorly threaded end providing a box at one extremity of the stem,
the other of said connectors having a portion of reduced outer diameter at its end opposite from its end that is connected to said body, said portion of reduced outer diameter being threaded to provide a pin at the other extremity of the stem,
the maximum outer diameter portion of each of said connectors being at least 1.2 times that of said main portion of the body whereby the rigidity of a connection comprising such pin and box connectors can be twice that of the main portion of the body of the stem, said connectors being long axially compared to the diameter thereof, the combined length of the maximum diameter portions of the pin and box connectors being at least four times the outer diameter of said maximum diameter portions, the outer surface of said main portion of said body being a turned machined surface, said body having ends of larger outer diameter than that of said main portion of the body, each connector being welded to one of said ends, said body having at least one portion located between and spaced from the ends of the body which one portion has a larger outer diameter than said main portion of the body, said portion of larger outer diameter providing a protector against wear on the main portion of the body, each said protector being homogeneously integral with said main portion of the body, said protector and main portion being one and the same single piece of metal, each said protector having an outer diameter at least one-half inch larger than the outer diameter of the main portion of the body of the stem, the length of each protector being at least twice the outer diameter of the connectors, said long connectors and each said protector being spaced apart along the length of the stem and serving as centralizers for said intermediate stem, said body including two elongated pieces of metal, each said piece of metal of the body extending from one of said larger diameter ends of the body to and into said protector portion of larger diameter between said ends, the portion of each of said pieces of metal where it extends into said protector portion of larger diameter constituting a butt, said butts being connected together butt to butt by added metal welding joining said butts together.

2. Subject matter of claim 1, including
hard facing around said protector.

3. Subject matter of claim 1, including
hard facing around each of said butts.

4. Subject matter of claim 1,
each of said butts having a ratio of length to outer diameter of at least about three to one.

5. Subject matter of claim 1,
said protector having a length of about 4 feet, said added weld metal lying at the mid portion of said protector.

6. Subject matter of claim 1,
each of said pieces of metal having a protector part homogeneously integral therewith disposed between said butt and said end thereof,
said protector part having a larger outer diameter than the main portion of said body.

7. Subject matter of claim 1,
said intermediate stem being of Range III length, i.e. about 40 to 50 feet long.

8. Subject matter of claim 7,
said intermediate stem having an inner diameter characteristic of a drill collar and an outer diameter characteristic of drill pipe.

9. An intermediate drill stem comprising
an elongated, tubular, steel body the main portion of which has a substantially uniform outer diameter,
said body having a wall thickness of at least about five-eighths inch in the main portion thereof,
a tubular alloy steel connector connected to each end of said body,
one of said connectors being interiorly threaded at its end opposite from its end that is connected to said body, said interiorly threaded end providing a box at one extremity of the stem,
the other of said connectors having a portion of reduced outer diameter at its end opposite from its end that is connected to said body, said portion of reduced outer diameter being threaded to provide a pin at the outer extremity of the stem,
the maximum outer diameter portion of each of said connectors being at least 1.2 times that of said main portion of the body whereby the rigidity of a connection comprising such pin and box connectors can be twice that of the main portion of the body of the stem,
said connectors being long axially compared to the diameter thereof, the combined length of the maximum diameter portions of the pin and box connectors being at least four times the outer diameter of said maximum diameter portions,
the outer surface of said main portion of said body being a turned machined surface,
said body having ends of larger outer diameter than that of said main portion of the body,
each connector being welded to one of said ends,
said body having at least one portion located between and spaced from the ends of the body which one portion has a larger outer diameter than said main portion of the body, said portion of larger outer diameter providing a protector against wear on the main portion of the body,
each said protector being homogeneously integral with said main portion of the body, said protector and main portion being one and the same single piece of metal,
each of said protector having an outer diameter at least one-half inch larger than the outer diameter of the main portion of the body of the stem,
the length of each protector being at least twice the outer diameter of the connectors,
said long connectors and each said protector being spaced apart along the length of the stem and serving as centralizers for said intermediate stem,
two additional protectors each homogeneously integral with said body and of larger other diameter than said main portion of the body,
the three said protectors being spaced apart along the length of said intermediate stem,
each of said protectors having a length of at least about three times the outer diameter of the maximum outer diameter portions of the connectors.

* * * * *